United States Patent
Hammer et al.

(10) Patent No.: US 8,318,274 B2
(45) Date of Patent: Nov. 27, 2012

(54) FOOD CASING FROM A COATED, TWO-DIMENSIONAL FIBER STRUCTURE

(75) Inventors: Klaus-Dieter Hammer, Mainz (DE); Herbert Gord, Ingelheim (DE); Jens Foegler, Taunusstein (DE); Michael Seelgen, Idstein (DE)

(73) Assignee: Kalle GmbH, Wiesbaden (DE)

( * ) Notice: Subject to any disclaimer, the term of this patent is extended or adjusted under 35 U.S.C. 154(b) by 768 days.

(21) Appl. No.: 12/093,725

(22) PCT Filed: Nov. 21, 2006

(86) PCT No.: PCT/EP2006/011120
§ 371 (c)(1),
(2), (4) Date: May 15, 2008

(87) PCT Pub. No.: WO2007/059911
PCT Pub. Date: May 31, 2007

(65) Prior Publication Data
US 2008/0280021 A1    Nov. 13, 2008

(30) Foreign Application Priority Data
Nov. 25, 2005  (DE) .......................... 10 2005 056 574

(51) Int. Cl.
*A23C 13/00*  (2006.01)
*A23B 4/023*  (2006.01)

(52) U.S. Cl. ...................................... 428/34.8; 426/652

(58) Field of Classification Search ................. 428/34.8; 426/652
See application file for complete search history.

(56) References Cited

U.S. PATENT DOCUMENTS

| 2,988,451 A | * | 6/1961 | Zahn | 426/140 |
| 3,617,312 A | | 11/1971 | Rose | |
| 2002/0022100 A1 | * | 2/2002 | Gord et al. | 428/36.9 |
| 2007/0014899 A1 | * | 1/2007 | Wolf | 426/135 |

FOREIGN PATENT DOCUMENTS

| DE | 31 47 519 A1 | 7/1983 |
| DE | 37 04 563 A1 | 2/1987 |
| DE | 41 23 745 A1 | 1/1993 |
| DE | 103 60 610 | 7/2005 |
| WO | WO 2004/098299 | 11/2004 |

OTHER PUBLICATIONS

PVP; http://online1.ispcorp.com/Brochures/Performance%20Chemicals/PVP.pdf; (retrieved Mar. 9, 2011).*

* cited by examiner

*Primary Examiner* — Rena Dye
*Assistant Examiner* — James Yager
(74) *Attorney, Agent, or Firm* — ProPat, L.L.C.

(57) ABSTRACT

The invention relates to a food casing from a two-dimensional fiber structure, which is coated on one or both sides with acrylic resin. The acrylic resin is combined with at least one other natural and/or synthetic polymer. The acrylic resin in the coating may be admixed with the other polymer. The latter can also form a layer of it's own. On the inside of the casing (i.e. on the side facing the food), this coating prevents gelling out, while at the outside it has a mainly permeability-increasing effect. The casing is particularly used as artificial sausage casing, especially for cooked-smoked sausages.

24 Claims, No Drawings ously coated on the side facing the food with acrylic resin and at least one other polymer. The acrylic resin and at least one other polymer which is combinable in the form of an aqueous solution or dispersion with the acrylic resin which is likewise applied in the form of an aqueous dispersion can in this case be mixed with one another and/or occur in separate layers. It is important that the side facing the sausage emulsion does not comprise acrylate, or at least not solely acrylate, because otherwise the permeation of the casing and/or the emulsion adhesion is insufficient.

FOOD CASING FROM A COATED, TWO-DIMENSIONAL FIBER STRUCTURE

CROSS-REFERENCE TO RELATED APPLICATIONS

This application is being filed under Rule 1.371 as a National Stage Application of pending International Application No. PCT/EP2006/011120 filed Nov. 21, 2006, which claims priority to the following parent application: German Patent Application No. 10 2005 056 574.3, filed Nov. 25, 2005. Both International Application No. PCT/EP2006/011120 and German Patent Application No. 10 2005 056 574.3 are hereby incorporated by reference herein in their entirety.

FIELD OF THE INVENTION

The present invention relates to a food casing made of a two-dimensional fiber structure which is coated on one or both sides with acrylic resin, a process for production thereof, and use thereof as artificial sausage casing.

BACKGROUND OF THE INVENTION

Acrylate-coated fiber structures and food casings made therefrom are already known (for example from DE 31 47 519 A1 or from DE 37 04 563 C2). In the production thereof, for example a loop-formingly knitted fabric, a laid scrim or a light nonwoven is introduced into an acrylate layer. The flat material can comprise natural fibers (such as cotton, linen or wool), modified natural fibers (for example regenerated cellulose or cellulose esters), fully synthetic chemical fibers (for example polyamide, polyester, polypropylene or polyacrylonitrile) or mixtures thereof. The laminate formed in this manner is dried and cut into strips of appropriate width. The strips are shaped to form food casings and glued or welded together at the edges. In the finished food casings the acrylate layer generally forms the outside. Flat materials of low strength may also be processed, which cannot be directly coated, if they are laid into an acrylate resin layer. The coated flat material can also comprise a plurality of acrylate layers. However, casings coated with acrylate alone, mostly have too low a sausage emulsion adhesion, ie. between sausage emulsion surface and the inside of the casing, what is termed a gel deposit can form. In addition, they are not very supple and generally also have insufficient permeation.

The object was therefore to provide a food casing which may be prepared simply and inexpensively and is permeable to smoke components. The casing must be suitable, in particular, for sausage varieties which, as slicer ware, are frequently traded in a vacuum packaging and in which the casing is already removed again. Scalded-emulsion sausage is mostly offered in this form. The casing is therefore only of importance for the duration of production. During this time it must ensure the shape of the final product and avoid weight loss due to drying out. In addition, the casing must be supple in order that it may be processed readily, have sufficient adhesion to the food and be able to be peeled off readily. In addition,—in accordance with the food to be packaged—it must have sufficient permeation. Finally, the casing must also be able to be shirred to form what are termed shirred sticks, so that it can be processed on high-speed automatic stuffing machines.

SUMMARY OF ADVANTAGEOUS EMBODIMENTS OF THE INVENTION

Said objects may be achieved, surprisingly, by a casing which comprises a two-dimensional fiber structure which is

DETAILED DESCRIPTION OF ADVANTAGEOUS EMBODIMENTS OF THE INVENTION

The present invention accordingly relates to a food casing made of a two-dimensional fiber structure which is coated on one or both sides with acrylic resin, wherein the acrylic resin is combined with at least one other polymer and at least the coating, on the side of the casing facing the food comprises at least one other polymer.

In one embodiment, the acrylic resin in the coating on the side facing the food is blended with at least one other polymer. In a further embodiment, this other polymer forms a separate layer. Preferably, the coating comprises a plurality of layers of identical or different composition. Layers of pure acrylate should be thin, so that the desired permeation is not impaired.

In a particular embodiment, the side of the casing which is facing away from the food is also coated with acrylic resin and likewise comprises at least one other polymer which can be mixed with the acrylic resin and/or can form at least one separate layer.

The acrylic resin is a homopolymer or copolymer of or comprising units of esters of acrylic acid or methacrylic acid (in the following abbreviated as "(meth)acrylic acid") with— preferably straight-chain—($C_1$-$C_{10}$) alkanols. A preferred ester is butyl acrylate. Suitable comonomers are, in particular, unsaturated monocarboxylic or dicarboxylic acids such as (meth)acrylic acid, crotonic acid, itaconic acid, fumaric acid and/or maleic acid, and also (meth)acrylic acid hydroxyalkyl esters, such as 2-hydroxyethyl (meth)acrylate or 3-hydroxybutyl (meth)acrylate. The fraction of comonomer units of monomers having such hydrophilic groups should expediently be no more than 10% by weights, preferably no more than 5% by weight, based on the total weight of the copolymer. Instead of, or also additionally to, these comonomers having hydrophilic groups, others can also be used, for example styrene, α-methylstyrene or vinyl acetate. The copolymers can finally also comprise units of monomers having two or more crosslinkable groups. Such monomers are, for example, esters of (meth)acrylic acid with polyols. These include, for example, ethylene glycol, di(meth)acrylate, butanediol di(meth)acrylate or trimethylolpropane trimethacrylate. The total fraction oft all, comonomer units in the copolymers should expediently be no more than 20% by weight, preferably no more than 15% by weight, in each case based on the weight of the copolymers.

The "other polymer" can be a synthetic polymer or a natural polymer. The synthetic polymers can belong to different classes, for example they can be polycondensation or polyaddition products. Preference is given to polyvinylpyrrolidones and also copolymers with vinylpyrrolidone units, homopolymers or copolymers of or comprising units of vinyl alcohol, polyalkylene glycols or polyacrylamides. Suitable substances are, in addition, proteins (for example collagen hydrolyzates), polyurethanes or synthetic rubbers. The polymers must be readily compatible with the acrylate and must not separate again. Generally, they are added in the form of an aqueous dispersion or aqueous solution. If "other polymers" are used which have a greater or lesser water solubility (such as collagen hydrolyzate or polyamide), they are then expediently combined with a crosslinking agent, for example glyoxal or glutaraldehyde. This prevents them from being extracted from the surface (inner or outer) during further processing of the food casing. The crosslinking agent is generally added in an amount of 5 to 10% by weight, based on the weight of the polymer to be crosslinked.

The "other polymers" can also be present in the form of fibers. Fibers of natural polymers are, in particular, collagen fibers. They can have a length of up to 4 mm, preferably up to 2 mm. An important function of the further polymers is to determine the adhesion and separation properties with respect to a food which is situated in the casing. A further essential function is to set the permeation of the casing in the desired manner, ie., in particular, to increase the permeation.

They therefore do not act simply only as pure thickeners, as do the cellulose ethers described in DE 31 47 519. The other polymer preferably has a relatively high water solubility. In one liter of water of 20° C., preferably at least 25 g thereof dissolve, particularly preferably at least 50 g. The fraction of this polymer must be large enough such that sufficient adhesion to the intended food is ensured. Depending on the type of the other polymer, this fraction is expediently 8 to 49% by weight, preferably 15 to 30% by weight, based on the total weight of the coating.

In a preferred embodiment, said "other polymer" forms a continuous layer which is situated on a layer of or comprising acrylic resin. The layer in this case can be relatively thin, just sufficient to ensure sufficient adhesion to a food, in particular a sausage emulsion.

As a result of the addition if the at least one other polymer, the casing according to the invention exhibits a high $H_2O$ permeation. This is generally about 30 to 600 $l/m^2$ d, determined as specified in ISO 15106-3:2003(E).

The total weight of the coating(s) is generally about 30 to 100 $g/m^2$, preferably about 40 to 80 $g/m^2$. The food casing therefore has a total weight of about 45 to 175 $g/m^2$, preferably about 60 to 120 $g/m^2$.

The two-dimensional fiber structure is preferably a spunbonded nonwoven, a consolidated nonwoven, a fiber paper, a woven fabric or a loop-formingly knitted fabric. The fibers from which the fiber structure is composed comprise, in particular, artificial fibers, such as polyamide, polyacrylonitrile, polypropylene and/or polyester fibers, and/or natural fibers, such as hemp fibers, cotton fibers, silk, linen, wool, and/or modified natural materials, such as regenerated cellulose. Particular preference is given to polyamide spunbonded nonwovens and also hemp fiber papers which comprise welded, polypropylene fibers. The two-dimensional fiber structure generally has—before coating—a weight of 12 to 80 $g/m^2$, preferably 18 to 60 $g/m^2$.

The two-dimensional fiber structure can be coated either only on one side or also on both sides. In the case of fiber structures which are coated on both sides, the coating on the side which is later facing away from the food, ie. forms the outside of the casing, can additionally comprise further pigments which increase the roughness of the surface. Suitable substances for this are, for example, inorganic or organic, particulate or fibrous materials, such as (micro)crystalline cellulose or collagen fibrils.

Producing the food casing proceeds, for example, by coating the two-dimensional fiber structure using conventional devices, for example by roller-supported doctors, air doctor blades or rubber sheet spreaders. The aqueous dispersions used as spreading compositions are generally sufficiently highly viscous that thickeners are not necessary and are therefore also not present. After coating, drying proceeds, preferably using hot air or by infrared radiation. The drying temperature is expediently about 90 to 150° C., for short times, temperatures up to 190° C. can also be reached. The coating and drying is if appropriate repeated once or several times, corresponding to the number of the coatings. When the coated two-dimensional fiber structure is too wide for direct further processing, it is cut into a plurality of strips of appropriate width which are then in each case shaped to form a tube having overlapping longitudinal edges. The longitudinal edges are firmly bonded to one another, preferably by gluing together. Suitable glues are, particularly, what are termed hotmelt glues and glues based on polyurethane. The longitudinal edges can also be bonded to one another by welding, for example by high-frequency welding. In this case, in addition, melt glues can also be used. The casing according to the invention may be produced simply and inexpensively using said processes.

The tubular casings can be finally prepared as conventional, ie. distributed as sections closed at one end or as bands. Preferably, however, they are shirred, so that they can be processed on high-speed stuffing machines.

The food casing according to the invention is used, especially, as artificial sausage casing, in particular for scalded-emulsion sausage, very particularly for smoked scalded-emulsion sausage, such as Fleischwurst, Bierwurst, Leberwurst, or for pâtés. Large calibers of the casing according to the invention can also be used for cooked ham. The casing is particularly suitable for producing what is termed slicer ware, ie. sausage products from which the casing is removed and which are sold in the form of slices. In this case the casing serves especially for shaping.

The examples hereinafter serve to illustrate the invention. Percentages herein are percentages by weight, unless stated otherwise or is immediately clear from the context. PBW means part(s) by weight.

EXAMPLE 1

A polyamide spunbonded nonwoven (type FFL 2704 from Freudenberg) having a weight of 60 $g/m^2$ in the form of a 165 cm wide strip was first coated with a spreading composition comprising butyl acrylate polymer and dried with hot air. The coating thus produced had a weight of 10 $g/m^2$. An aqueous solution of polyvinylpyrrolidone (PVP K 120) was applied thereon. The second coating had a weight of 24 $g/m^2$. Again a further aqueous spreading composition was applied thereon, which spreading composition comprised a mixture of 80 PBW butyl acrylate polymer and 20 PBW collagen hydrolyzate. Thereafter the strip was briefly dried at 180° C. The third coating, after drying, had a weight of 15 $g/m^2$. The total weight of the material was accordingly 109 $g/m^2$. It was smoke-permeable to a great extent and its water vapour permeability was 60 $g/m^2$ d.

The coated spunbonded nonwoven was cut into individual strips having a width of 19.2 cm which were then each shaped to form a tube having overlapping longitudinal edges, wherein the coatings were situated on the inside. The longitudinal edges were firmly bonded using a hotmelt glue. In this manner a tubular casing of caliber 60 was generated. The casing was then shirred, subsequently stuffed with Bierwurst emulsion, scalded and smoked. Thereafter the casing was taken off, the sausage emulsion was cut into slices and surrounded with a film packaging.

EXAMPLE 2

A hemp fiber paper having a width of 165 cm and a weight of 25.4 $g/m^2$ which comprised 10% welded polypropylene fibers was coated with a coating composition which comprised a mixture of 90 PBW n-butyl acrylate polymer and 10 PBW of polyvinylpyrrolidone (PVP K120). After it was dried with hot air, the coating weight was 8 g/m$^2$. Subsequently, two further layers of the same polymer mixture were applied. The second layer had a weight of 20 g/m$^2$, the third 15 g/m$^2$. The strip thus coated was cut into 22.2 cm wide strips which were then each shaped to form a tube having overlapping longitudinal edges, wherein the coatings were again situated on the inside. The longitudinal edges were then, as in example 1, bonded firmly to one another using a hotmelt glue. The casing produced in this manner of caliber 70 was considerably more supple than a casing made of only acrylate-coated fiber paper.

The casing was shirred, stuffed with Fleischwurst emulsion and smoked. After smoking the casing was taken off, the sausage cut into slices and surrounded with a film packaging.

The invention claimed is:

1. A shirrable food casing comprising a two-dimensional fiber structure which is coated on one or both sides with acrylic resin, wherein the acrylic resin is combined with at least one polymer other than acrylic and the coating, present on the side of the casing facing food directly contacts the food, the coating-polymer consists of acrylic and at least one polymer other than acrylic, and the polymer other than acrylic is a polyvinylpyrrolidone or a copolymer having vinylpyrrolidone units, a homopolymer or copolymer of or comprises units of vinyl alcohol, a polyalkylene glycol, a polyacrylamide, a polyurethane or a synthetic rubber, the total weight of the coating(s) is 30 to 100 g/m$^2$, and the acrylic resin is in the coating on the side facing the food and is blended with said at least one polymer other than acrylic.

2. The food casing as claimed in claim 1, wherein the acrylic is a homopolymer or copolymer of or comprises units of esters of acrylic acid or methacrylic acid with ($C_1$-$C_{10}$) alkanols.

3. The food casing as claimed in claim 1, wherein the polymer other than acrylic has a solubility in water at 20° C. of at least 25 g/l.

4. The food casing as claimed in claim 1, wherein the fraction of the polymer other than acrylic is 8 to 49% by weight, based on the total weight of the coating.

5. The food casing as claimed in claim 1, wherein said casing has an $H_2O$ permeation of 30 to 600 l/m$^2$ d.

6. The food casing as claimed in claim 1, wherein the side of the casing which is facing away from food is coated with a coating, said coating comprising acrylic resin and at least one polymer other than acrylic.

7. The food casing as claimed in claim 6, wherein the coating on the outside of the casing facing away from the food comprises the polymer other than acrylic mixed with the acrylic resin and/or forming a separate layer.

8. The food casing as claimed in claim 1, wherein said food casing has a total weight of 45 to 175 g/m$^2$.

9. The food casing as claimed in claim 1, wherein the two-dimensional fiber structure is a spunbonded nonwoven, a consolidated nonwoven, a fiber paper, a woven fabric or a loop-formingly knitted fabric.

10. The food casing as claimed in claim 1, wherein the fibers comprise artificial fibers,-and/or natural fibers, and/or modified natural materials.

11. The food casing as claimed in claim 1, wherein the two-dimensional fiber structure, before coating, has a weight of 12 to 80 g/m$^2$.

12. The food casing as claimed in claim 1, wherein said food casing is tubular and has at least one longitudinal seam.

13. Scalded-emulsion sausage casing comprising the food casing as claimed in claim 1.

14. The food casing as claimed in claim 3, wherein the polymer other than acrylic has a solubility in water at 20° C. of at least 50 g/l.

15. The food casing as claimed in claim 4, wherein the fraction of the polymer other than acrylic is 15 to 30% by weight, based on the total weight of the coating.

16. The food casing as claimed in claim 1, wherein the total weight of the coating(s) is 40 to 80 g/m$^2$.

17. The food casing as claimed in claim 8, wherein said food casing has a total weight of 60 to 120 g/m$^2$.

18. The food casing as claimed in claim 10, wherein (i) the artificial fibers comprise polyamide, polyacrylonitrile, polypropylene and/or polyester fibers, (ii) the natural fibers comprise hemp fibers, cotton fibers, silk, linen and/or wool, and (iii) the modified natural materials comprise regenerated cellulose.

19. The food casing as claimed in claim 11, wherein the two-dimensional fiber structure, before coating, has a weight of 18 to 60 g/m$^2$.

20. The food casing as claimed in claim 12, wherein said longitudinal seam is glued and/or welded together.

21. Scalded-emulsion sausage casing as claimed in claim 13, wherein said scalded-emulsion sausage is smoked scalded-emulsion sausage.

22. A food casing as claimed in claim 1, wherein the polymer other than acrylic does not separate from the acrylic and has a solubility in water at 20° C. of at least 25 g/l, the fraction of the polymer other than acrylic is 8 to 49% by weight, based on the total weight of the coating, the total weight of the coating(s) is 30 to 100 g/m$^2$, and the resulting casing has an $H_2O$ permeation of 30 to 600 l/m$^2$ d.

23. The food casing as claimed in claim 1, wherein the polymer other than acrylic is polyvinylpyrrolidone and the food casings is more supple than a casing made of acrylate-coated fiber paper.

24. A process for producing a food casing as claimed in claim 1, which comprises the following steps:

providing a two-dimensional fiber structure, coating the fiber structure with a coating composition which consists of acrylic and at least one polymer other acrylic, and the polymer other than acrylic is a polyvinylpyrrolidone or a copolymer having vinylpyrrolidone units, a homopolymer or copolymer of or comprises units of vinyl alcohol, a polyalkylene glycol, a polyacrylamide, a polyurethane or a synthetic rubber, wherein the coating is present on the side of the casing facing food directly contacts the food, wherein the acrylic is in the coating on the side facing the food and is blended with said at least one polymer other than acrylic, drying the coating optionally cutting the coated two-dimensional fiber structure into individual strips, shaping the strips to tubes having overlapping longitudinal edges, joining the longitudinal edges by gluing and/or welding and optionally finally preparing the tubular casing.

* * * * *